United States Patent
Shiga

(10) Patent No.: US 8,144,428 B2
(45) Date of Patent: Mar. 27, 2012

(54) RECORDING TAPE CARTRIDGE AND DRIVE DEVICE FOR REDUCING FRICTION

(75) Inventor: Hideaki Shiga, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 337 days.

(21) Appl. No.: 12/554,008

(22) Filed: Sep. 4, 2009

(65) Prior Publication Data

US 2010/0073818 A1   Mar. 25, 2010

(30) Foreign Application Priority Data

Sep. 25, 2008   (JP) ................. 2008-246790

(51) Int. Cl.
*G11B 15/60*   (2006.01)

(52) U.S. Cl. .......................... 360/132; 360/93

(58) Field of Classification Search ............ 360/132, 360/93, 96.51
See application file for complete search history.

(56) References Cited

U.S. PATENT DOCUMENTS

| | | | | |
|---|---|---|---|---|
| 6,695,241 | B2 * | 2/2004 | Iino | 242/348 |
| 7,063,287 | B2 * | 6/2006 | Shiga et al. | 242/348.2 |
| 7,104,488 | B2 * | 9/2006 | Hiraguchi | 242/348 |

FOREIGN PATENT DOCUMENTS

JP   2002-312996 A   10/2002

* cited by examiner

*Primary Examiner* — Jefferson Evans
(74) *Attorney, Agent, or Firm* — SOLARIS Intellectual Property Group, PLLC

(57) ABSTRACT

The present invention provides a recording tape cartridge that when loaded in a drive device, generation of abrasion dust from a case can be restrained. The recording tape cartridge includes: a case in which a single reel with a recording tape being wound thereon is rotatably accommodated; a first region of the case, through which a plate spring provided in a drive device passes during loading of the recording tape cartridge into the drive device; and a second region of the case, which is disposed at a position higher than the first region and with which the plate spring comes into contact with pressure after the recording tape cartridge is loaded into the drive device.

11 Claims, 7 Drawing Sheets

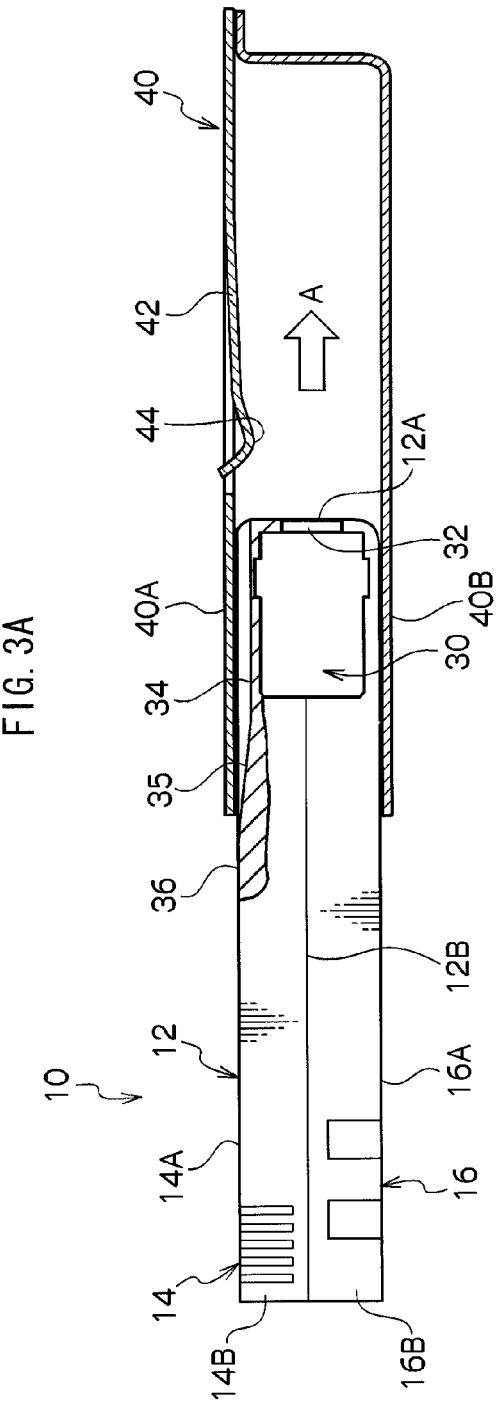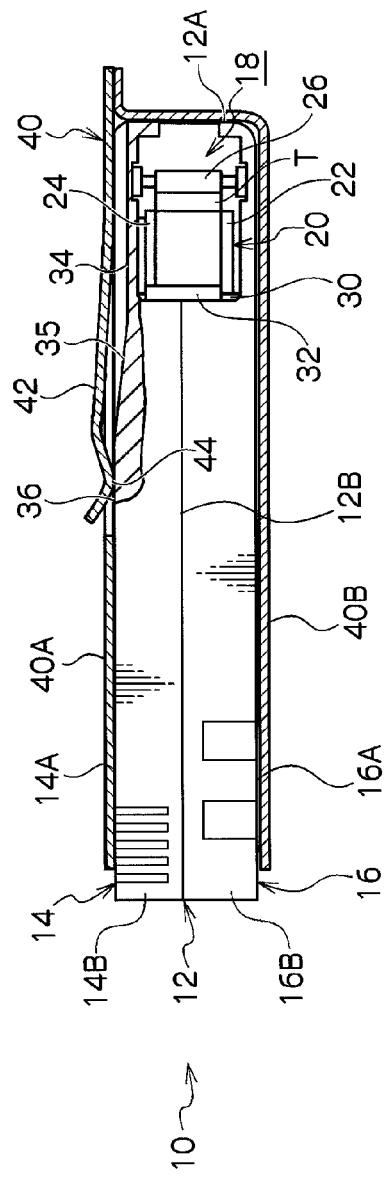

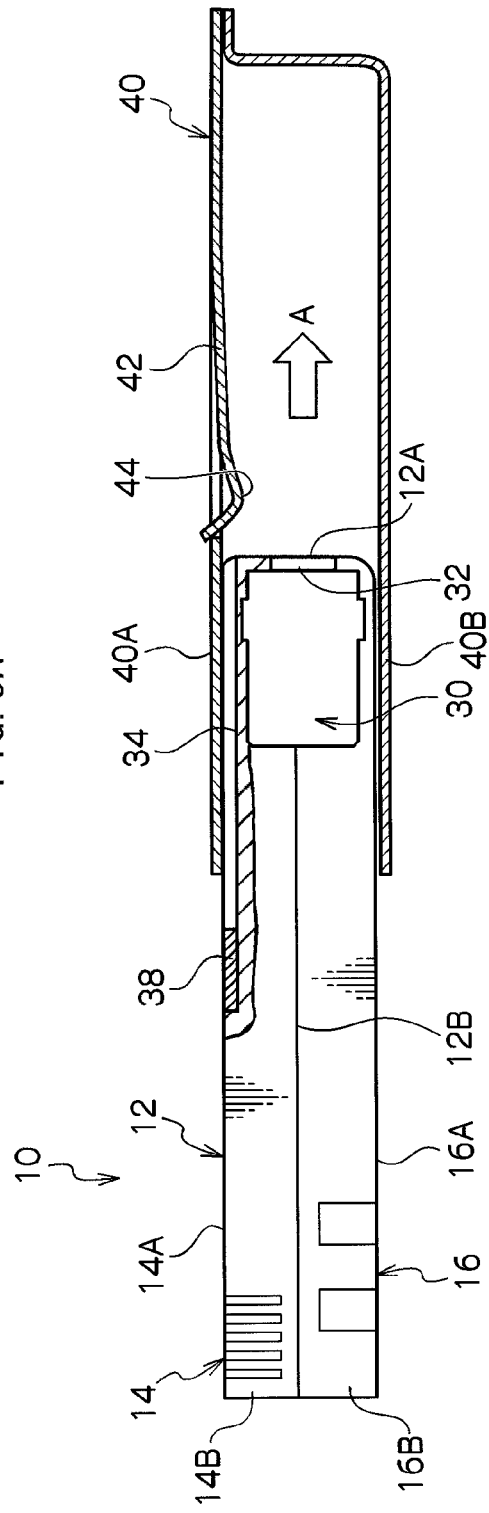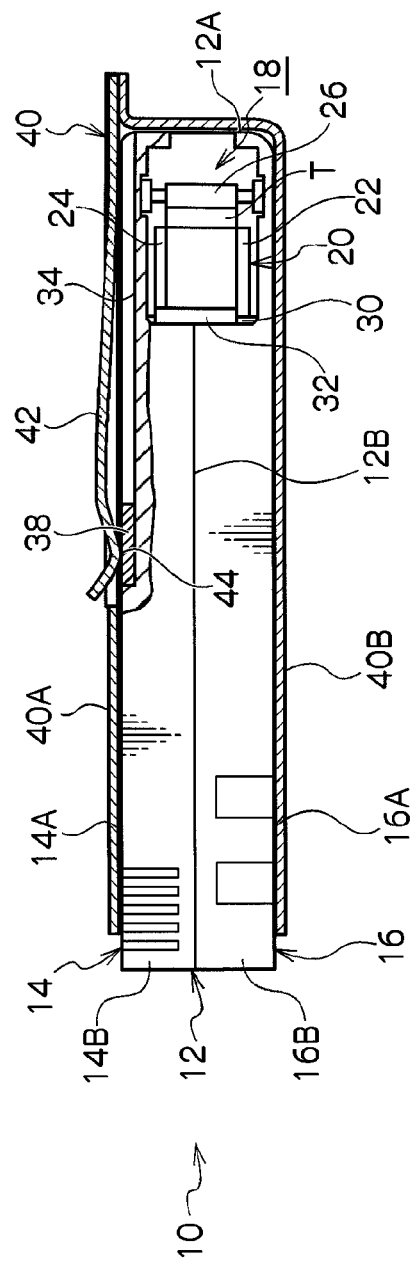

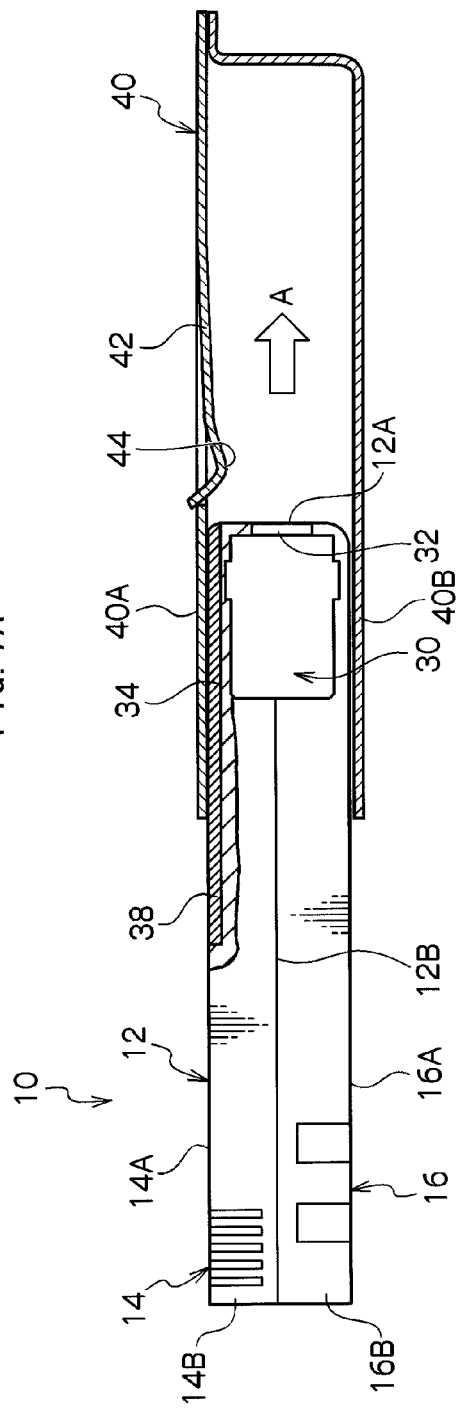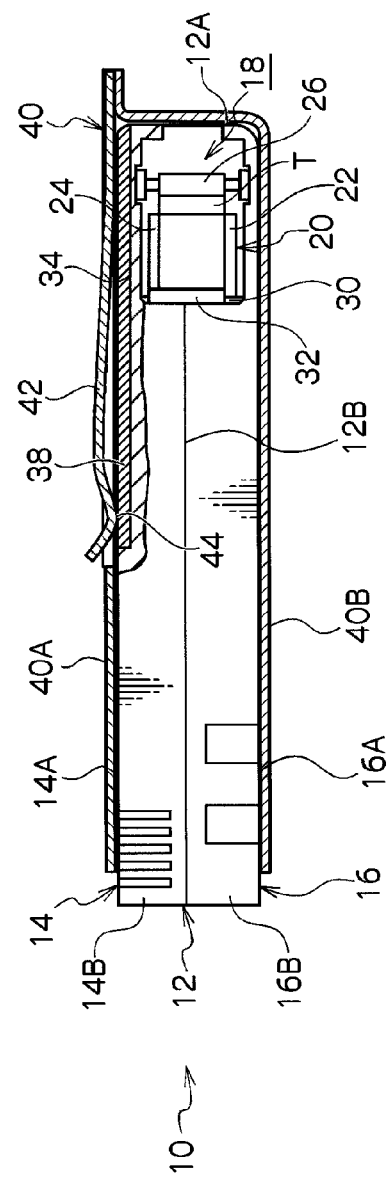

RECORDING TAPE CARTRIDGE AND DRIVE DEVICE FOR REDUCING FRICTION

CROSS-REFERENCE TO RELATED APPLICATION

This application claims priority under 35 USC 119 from Japanese Patent Application No. 2008-246790 filed on Sep. 25, 2008, the disclosure of which is incorporated by references herein.

BACKGROUND

1. Technical Field

The present invention relates to a recording tape cartridge in which a single reel, on which a recording tape such as a magnetic tape used as a recording and reproducing medium for, primarily, a computer or the like is wound, is accommodated in a case.

2. Related Art

Heretofore, a recording tape cartridge in which a single reel, on which a recording tape such as a magnetic tape used as a data recording and reproducing medium for a computer or the like is accommodated in a case, has been known. In a case in which such a recording tape cartridge as above is loaded into a drive device, the recording tape cartridge is loaded in a loader tray disposed at a loading gate of the drive device.

Subsequently, due to the entire loader tray being moved downward, a reel gear provided in the reel and a drive gear provided in the drive device mesh with each other. In order to provide favorable meshing between the reel gear and the drive gear, a plate spring is provided on a top plate of the loader tray, and the recording tape cartridge loaded in the loader tray is made to be pressed (urged) toward the bottom plate side of the loader tray by the plate spring.

However, due to the aforementioned structure, each time the recording tape cartridge is loaded in the loader tray, the plate spring moves slidingly relative to the top plate of the case at a predetermined pressure. Thus, the top plate is scraped and abrasion dust is generated. The abrasion dust ingresses in the case from the opening of the recording tape cartridge and adheres to the recording tape, or flies off toward a recording/reproducing head or a tape conveying passage within the drive device. This results in errors at the time of recording and reproducing, impediment of tracking, failure of a drive mechanism, and the like.

SUMMARY

In view of the aforementioned circumstances, the present invention provides a recording tape cartridge which can restrain generation of abrasion dust from a case when it is loaded in a drive device.

A recording tape cartridge according to the present invention includes a case in which a single reel with a recording tape wound thereon is rotatably accommodated; a first region of the case, through which a plate spring provided in a drive device passes during loading of the recording tape cartridge into the drive device; and a second region of the case, which is disposed at a position higher than the first region and with which the plate spring comes into contact with pressure after the recording tape cartridge is loaded into the drive device.

BRIEF DESCRIPTION OF THE DRAWINGS

Exemplary Embodiments of the present invention will be described in detail based on the following figures, wherein:

FIG. 3A is a partially cutaway side view schematically showing the recording tape cartridge of the first embodiment when the recording tape cartridge is loaded in a loader tray of a drive device;

FIG. 3B is a partially cutaway side view schematically showing the recording tape cartridge of the first embodiment when the recording tape cartridge is loaded in a loader tray of a drive device;

FIG. 5A is a partially cutaway side view schematically showing the recording tape cartridge of the second embodiment when the recording tape cartridge is loaded in a loader tray of a drive device;

FIG. 5B is a partially cutaway side view schematically showing the recording tape cartridge of the second embodiment when the recording tape cartridge is loaded in a loader tray of a drive device;

FIG. 7A is a partially cutaway side view schematically showing the recording tape cartridge of the modified example of the second embodiment when the recording tape cartridge is loaded in a loader tray of a drive device; and FIG. 7B is a partially cutaway side view schematically showing the recording tape cartridge of the modified example of the second embodiment when the recording tape cartridge is loaded in a loader tray of a drive device.

DETAILED DESCRIPTION

Figure 1:
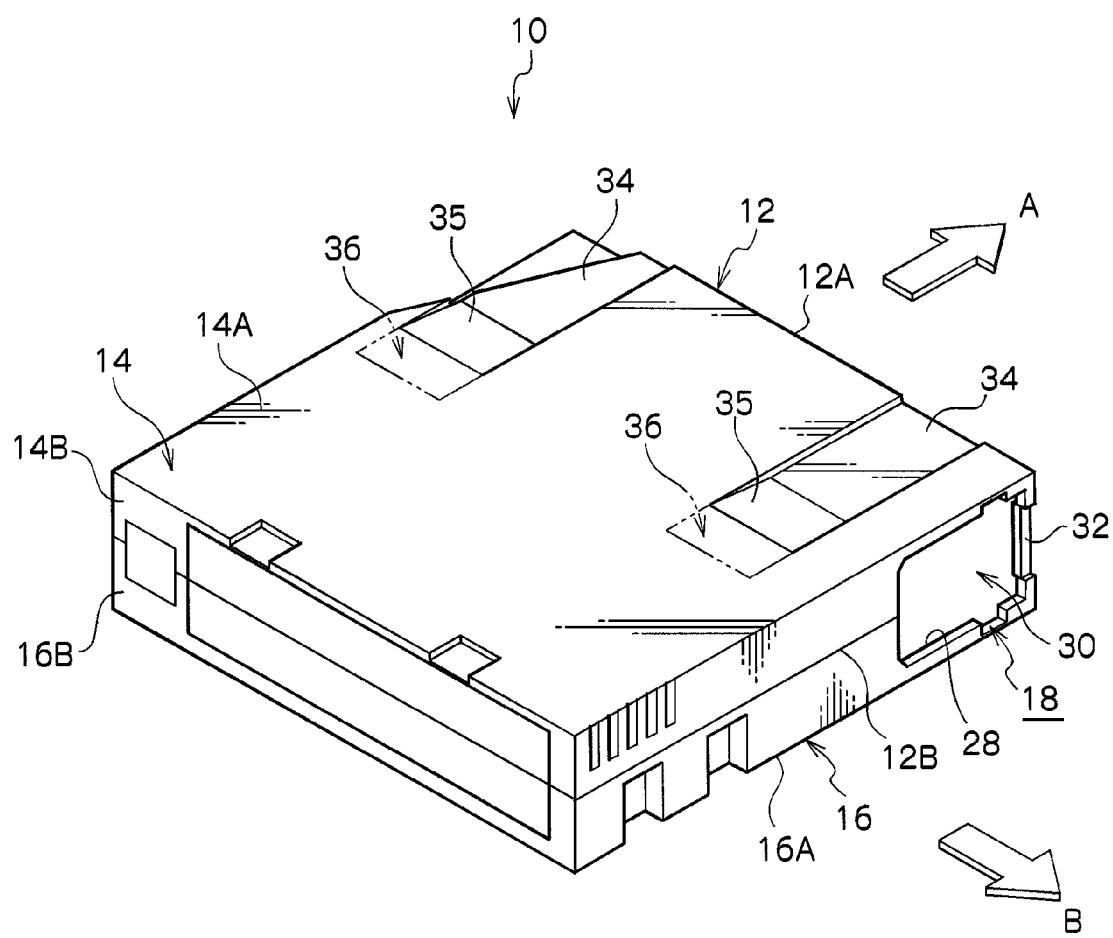
FIG. 1 is a perspective view schematically showing a recording tape cartridge of a first embodiment.

Most preferred embodiments of the present invention are hereinafter described in detail on the basis of examples shown in the attached drawings. For convenience of explanation, in FIG. 1, a direction in which a recording tape cartridge 10 is loaded in a drive device is indicated by arrow A, and coincides with a forward direction (front side) of the recording tape cartridge 10. A direction indicated by arrow B, which is orthogonal to the direction indicated by arrow A is a rightward direction (right side) of the recording tape cartridge 10. First, the first embodiment is described.

As shown in FIGS. 1, 2, 3A and 3B, the recording tape cartridge 10 has a case 12 having the shape of a substantially rectangular box. The case 12 is formed by joining up an upper case 14 and a lower case 16 that are made of resin material of polycarbonate (PC) or the like, by means of ultrasonic welding or screw fixation, in a state in which a peripheral wall 14B standing upright on a peripheral edge of the top plate 14 and a peripheral wall 16B standing upright on a peripheral edge of the bottom plate 16 are made to abut against each other.

A single reel 20 (see FIG. 3) is rotatably accommodated within the case 12. The reel 20 is formed by a reel hub (not shown) having the shape of a cylinder with a bottom and forming a shaft center portion, a lower flange 22 provided at a lower end portion of the reel hub, and an upper flange 24 provided at an upper end portion of the reel hub. A recording tape T such as a magnetic tape which serves as an information recording/reproducing medium is wound on an outer peripheral surface of the reel hub.

A reel gear (not shown) is formed in an annular shape on a lower surface of the bottom wall of the reel hub. A gear opening (not shown) is formed at the central portion of the lower case 16 so as to expose the reel gear to the outside. The reel gear exposed by the gear opening is driven to rotate in such a manner as to mesh with a drive gear (not shown) formed in a rotation shaft (not shown) of the drive device, thereby allowing the reel 20 to rotate relative to the case 12 within the case 12.

An opening 18 is formed on a right side wall 12B of the case 12 so as to pull out the recording tape T wound on the reel 20. A leader pin 26 (see FIG. 3B), pulled out while it is being locked by (engaged with) a pull-out member (not shown) of the drive device, is fixed to a free end of the recording tape T pulled out from the opening 18.

The opening 18 is opened and closed by a door 30. The door 30 is formed substantially in the shape of a rectangular plate such that the opening 18 can be closed thereby. A groove portion 28 is formed in each of the top plate 14A and the bottom plate 16A at the inner side of the opening 18 in such a manner that upper and lower end portions of the door 30 are slidingly fit in the groove portion 28. Thus, the door 30 can move along the right side wall 12B of the case 12. Then, the door 30 is constantly urged by an urging member (not shown) such as a coil spring or the like in a direction in which the opening 18 is closed.

Further, a convex portion 32 used for the opening/closing operation is provided in a state of protruding toward the outside of the case at the front end portion of the door 30. When the recording tape cartridge 10 is loaded into the drive device, the convex portion 32 is engaged with a convex portion for the opening/closing operation (not shown), which is provided on the right side wall at the inner side of a loader tray 40 (described later) of the drive device. As a result, the door 30 is formed so as to be opened up against the urging force of the coil spring.

Figure 2:
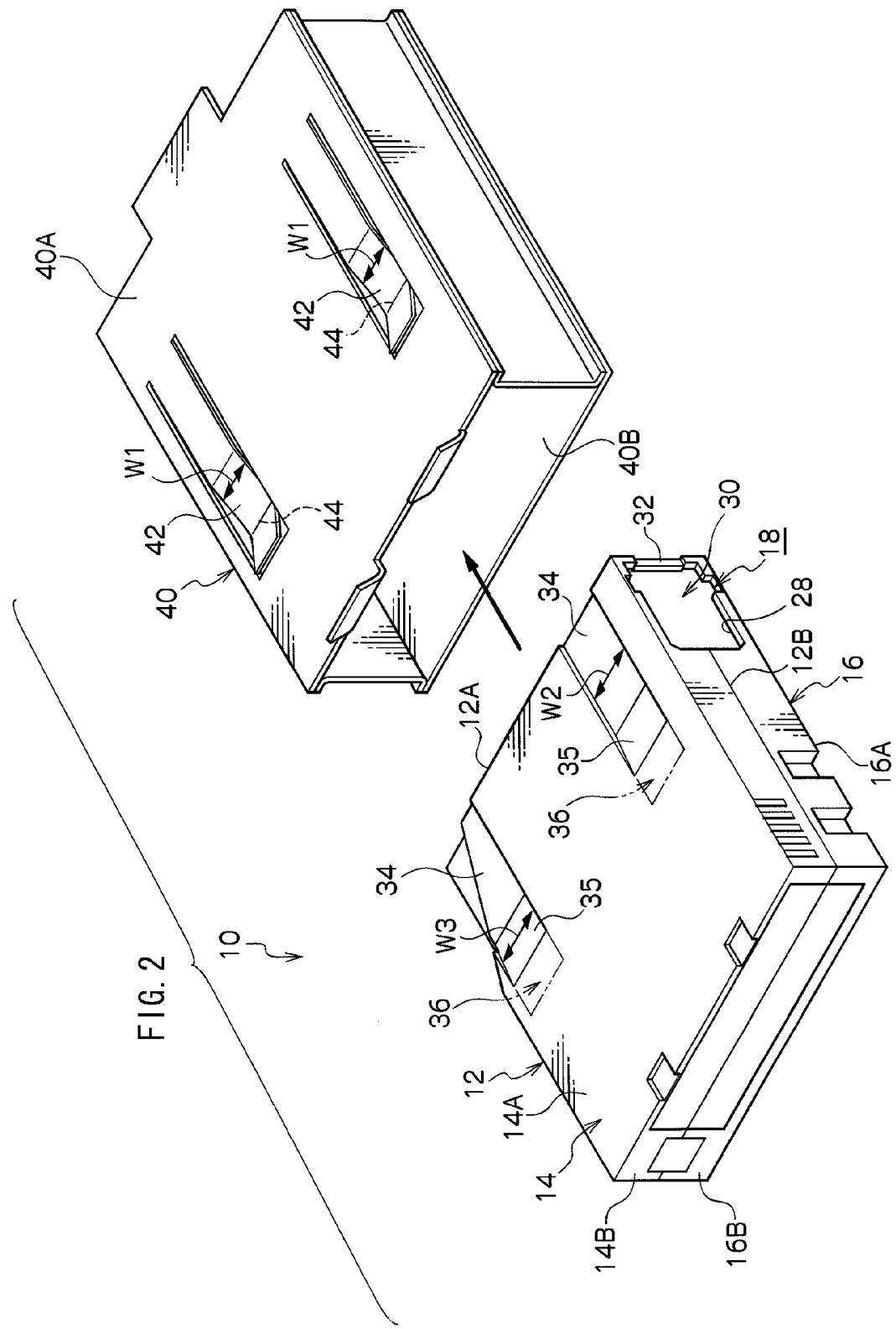
FIG. 2 is a perspective view schematically showing the recording tape cartridge of the first embodiment when the recording tape cartridge is loaded in a loader tray of a drive device.

As shown in FIG. 2 and FIGS. 3A and 3B, when the recording tape cartridge 10 is loaded into the drive device, it is loaded in the loader tray 40 disposed in a loading gate (not shown). A plate spring 42 serving as urging means is formed integrally with the top plate 40A of the loader tray 40 in such a manner that a portion thereof in the vicinity of the leading end (the rear side in the direction in which the recording tape cartridge 10 is loaded) is bent downward and formed as a pressure contact portion 44. The pressure contact portion 44 is urged at a predetermined pressure toward the lower side (toward the bottom plate 40B of the loader tray 40).

Accordingly, when the recording tape cartridge 10 is loaded in the loader tray 40 of the drive device, the pressure contact portion 44 of the plate spring 42 moves sliding on (comes into sliding-contact with) the outer surface of the top plate 14A of the upper case 14 in a relative manner at a predetermined pressure. On the sliding trajectory of the pressure contact portion 44 on the outer surface of the top plate 14A (a region through which the pressure contact portion 44 passes), a concave portion 34 (a first region) having a predetermined depth and having a width W2 not less than the width W1 of the plate spring 42 (the pressure contact portion 44) (W2≧W1) is formed.

Consequently, a structure is provided in which, when the recording tape cartridge 10 is loaded into the drive device (during loading), pressing force (frictional force) of the pressure contact portion 44 of the plate spring 42 with respect to the top plate 14A of the upper case 14 is reduced (this structure also includes a case in which the pressure contact portion 44 of the plate spring 42 does not contact the top plate 14A). In other words, a structure in which, due to the concave portion 34 being formed, generation of abrasion dust from the top plate 14A of the case 12 can be restrained is provided.

Further, at the point in time when loading of the recording tape cartridge 10 into the drive device in the forward direction is completed (this point in time means the "after loading" in the present invention), a predetermined region of the top plate 14A (which region is indicated by the imaginary lines in FIGS. 1 and 2) pressed by the pressure contact portion 44 of the plate spring 42 is formed as a pressure-applied portion 36 (a second region), and the concave portion 34 is not formed in the pressure-applied portion 36. In other words, the pressure-applied portion 36 is located at a position higher than the concave portion 34.

An upward slope portion 35 is formed between the pressure-applied portion 36 and the concave portion 34 in such a manner as to extend continuously from the concave portion 34 to the pressure-applied portion 36. As a result, a structure is provided in which, when the recording tape cartridge 10 is loaded in the loader tray 40, the pressure contact portion 44 of the plate spring 42 relatively moves sliding (comes into slide-contact) with the interior of the concave portion 34, and is led by the slope portion 35 to the pressure-applied portion 36 in the top plate 14A. As is obvious, the width W3 of the slope portion 35 is made substantially equal to the width W2 of the concave portion W2 (W2=W3).

Further, after the recording tape cartridge 10 is loaded into the drive device is completed, the pressure contact portion 44 of the plate spring 42 presses the pressure-applied portion 36 on the top plate 14A of the upper case 14 downward at a predetermined pressure. The pressure-applied portions 36 are each located substantially at the center in the longitudinal direction of the top plate 14A and at positions in the vicinities of both end portions in the transverse direction of the top plate 14A.

Accordingly, the recording tape cartridge 10 can be favorably pressed downward by the pressing force of the plate spring 42, and the outer surface of the bottom plate 16A of the lower case 16 can also be favorably pressed on the inner surface of the bottom plate 40B of the loader tray 40. In other words, this leads to a structure in which the reel gear exposed to the outside from the gear opening is reliably made to mesh with the drive gear of the drive device.

In the recording tape cartridge 10 of the first embodiment as described above, the operation thereof is hereinafter described. In the recording tape cartridge 10 having the aforementioned structure, when it is not in use (stored, transported or the like), the opening 18 is closed by the door 30. When the recording tape T is in use, the recording tape cartridge 10 is loaded into the drive device along the direction indicated by arrow A with the front side wall 12A taking the lead. Then, the loader tray 40 is in a standby state, and therefore, the recording tape cartridge 10 is loaded in the loader tray 40.

Here, the plate spring 42 having the pressure contact portion 44 that is urged downward is provided on the top plate 40A of the loader tray 40, and therefore, the recording tape cartridge 10 is loaded while it is being pressed downward by the pressure contact portion 44 of the plate spring 42. At this time, the concave portion 34 having a predetermined depth is formed on the outer surface of the top plate 14A of the upper case 14 on the sliding track of the pressure contact portion 44, and therefore, the pressing force (frictional force) of the pressure contact portion 44 with respect to the top plate 14A during the loading is reduced.

Accordingly, the force of the pressure contact portion 44 (plate spring 42) scraping the outer surface of the top plate 14A of the upper case 14 is reduced, and generation of abrasion dust from the outer surface of the top plate 14A can be restrained. As a result, it is possible to prevent occurrence of errors at the time of recording and reproducing, or impediment of tracking, each of which is caused from ingress of abrasion dust from the opening 18 to the interior of the case 12, and adherence of the abrasion dust to the recording tape T, or from scattering of the abrasion dust toward a recording/reproducing head (described later) or in a tape conveying passage, and also prevent the abrasion dust from causing failure of a drive mechanism, or the like.

Further, as the pressure contact portion 44 moves sliding relative to the interior of the concave portion 34, it moves upward against the urging force of the plate spring 42 by the slope portion 35, and is removed from the concave portion 34. Then, as the loading of the recording tape cartridge 10 toward the front side with respect to the loader tray 40 is completed, the pressure contact portion 44 presses the pressure-applied portion 36 on the outer surface of the top plate 14A of the upper case 14 at a predetermined pressure. As a result, the recording tape cartridge 10 is favorably pressed downward and is accurately positioned within the loader tray 40.

Further, when the recording tape cartridge 10 is loaded in the loader tray 40, a convex portion for the opening/closing operation provided on the right side wall of the loader tray 40 engages with the convex portion 32 of the door 30. In this state, as the recording tape cartridge 10 moves within the loader tray 40 in the direction indicated by arrow A, the convex portion for the opening/closing operation moves the convex portion 32 relatively in the rearward direction against the urging force of the coil spring. Consequently, the door 30 having the convex portion 32 projecting therefrom moves sliding toward the rear side within the groove portion 28 along the right side wall 12B of the case 12 and opens the opening 18 (see FIG. 3B).

In this manner, when the recording tape cartridge 10 is loaded in the loader tray 40, and the loading operation is completed to completely open the opening 18, the loader tray 40 further moves to a predetermined position in the direction indicated by arrow A, and subsequently, it moves downward by a predetermined height with the recording tape cartridge 10 being accommodated therein. Consequently, a positioning member (not shown) of the drive device is inserted relatively in a positioning hole formed in the lower case 16, and the recording tape cartridge 10 is accurately located at a predetermined position in the drive device.

During the downward movement of the loader tray 40 (recording tape cartridge 10), the rotation shaft ingresses relatively from the gear opening, so as to cause the drive gear to mesh with the reel gear. At this time, the recording tape cartridge 10 is urged downward (toward the bottom plate 40B of the loader tray 40) by the plate spring 42 provided in the loader tray 40, and therefore, the drive gear can reliably mesh with the reel gear. Then, during the operation of meshing the drive gear with the reel gear, the reel 20 moves upward by a predetermined height (to the position at which the tape can be moved) within the case 12, and the reel 20 is made rotatable relative to the case 12.

Further, the pull-out member provided in the drive device ingresses in the case 12 from the opened opening 18, and holds and pulls out the leader pin 26. The leader pin 26 pulled out from the opening 18 is accommodated in a take-up reel (not shown). Due to the take-up reel and the reel 20 being driven to rotate in a synchronized manner, the recording tape T is sequentially pulled out from the case 12 while it is being taken up onto the take-up reel, and thus, information is recorded or reproduced by a recording/reproducing head (not shown) disposed along a predetermined tape path.

In the case in which the recording tape cartridge 10 is discharged from the drive device after recording or reproduction of information is completed, the rotation shaft rotates in the reverse direction, so that the recording tape T is wound back to the reel 20. Then, when the recording tape T is completely wound back to the reel 20 and the leader pin 26 is accommodated and held in the case 12, the loader tray 40 (recording tape cartridge 10) moves upward by a predetermined height, and the positioning member is pulled out from the positioning hole portion. At the same time, the reel 20 moves downward to its original position within the case 12, and the rotation shaft is pulled out from the gear opening, thereby causing meshing of the drive gear with respect to the reel gear to be released.

Then, when the loader tray 40 moves to its original position in a direction opposite to the direction indicated by arrow A, the recording tape cartridge 10 is moved by an eject mechanism (not shown) in the direction opposite to the direction indicated by arrow A and is discharged from the loader tray 40. Consequently, due to the aforementioned movement, the door 30 is moved sliding by the urging force of the coil spring in a direction in which the opening 18 is closed, and the opening 18 is closed (returns to its initial state).

Further, at this time, the pressure contact portion 44 of the plate spring 42 is made to move sliding in the concave portion 34 from the pressure-applied portion 36 via the slope portion 35 in the direction opposite to the direction in which the cartridge is loaded (the direction opposite to the direction indicated by arrow A). In this case as well, as previously described, generation of abrasion dust from the top plate 14A is restrained. In this manner, the recording tape cartridge 10 is completely discharged from the drive device (loader tray 40).

Figure 4:
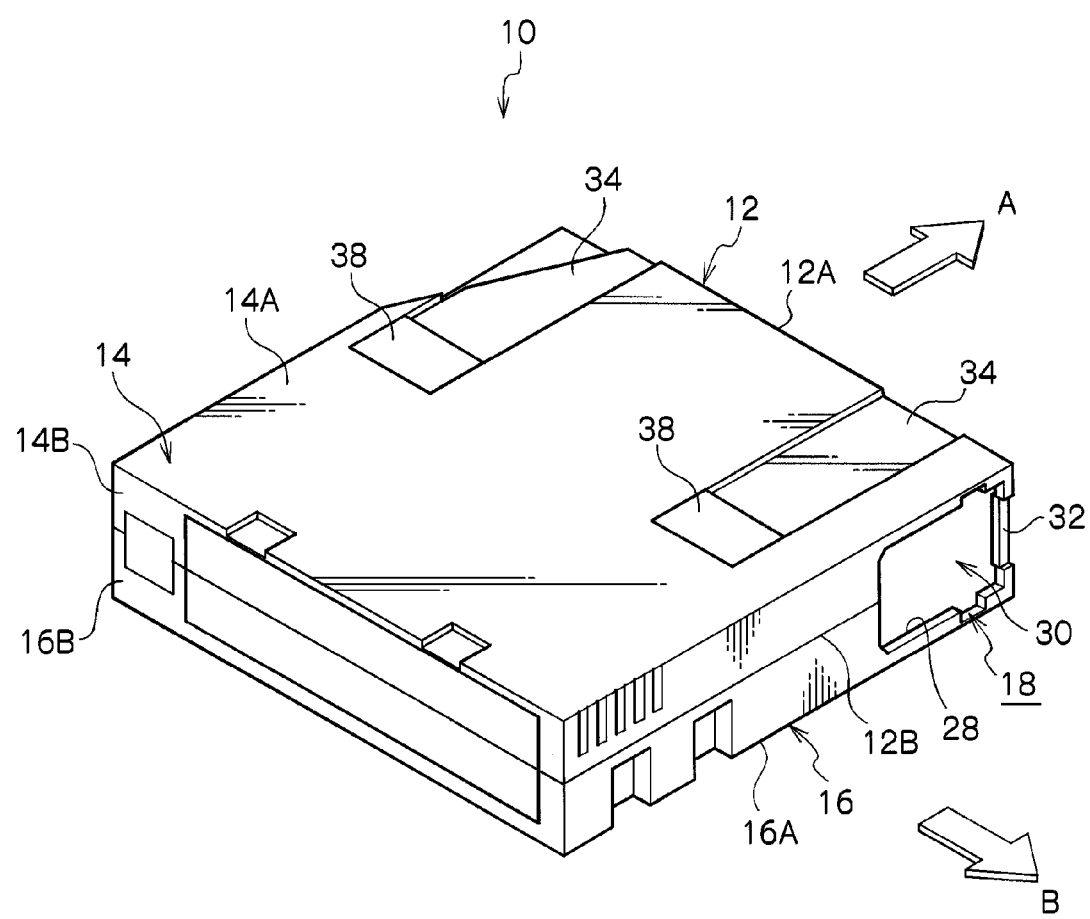
FIG. 4 is a perspective view schematically showing a recording tape cartridge of a second embodiment.

Next, a second embodiment is described. Note that the same parts as those of the first embodiment will be denoted by the same reference numerals, and a description thereof will be omitted. As shown in FIG. 4 and FIGS. 5A and 5B, in the recording tape cartridge 10, a low-friction and hard-wearing member 38 made of resin material whose coefficient of friction is lower and which is less subject to wear compared to the resin material forming the case 12, that is, polycarbonate (PC) resin or acrylonitrile-butadiene-styrene (ABS) resin, is provided at a position corresponding to the pressure-applied portion 36 by means of two color molding, sticking or the like.

The resin material whose coefficient of friction is lower and which is less subject to wear compared to polycarbonate (PC) resin, acrylonitrile-butadiene-styrene (ABS) resin or the like is polyacetal (POM), a fluorine resin, or another crystalline resin material. Even if such a resin material as above is pressed by the pressure contact portion 44 of the plate spring 42, abrasion dust is not liable to be generated from the resin material. Incidentally, in the recording tape cartridge 10 shown in FIG. 4 and FIGS. 5A and 5B, the slope portion 35 is not provided between the concave portion 34 and the low-friction and hardly-wearing member 38, but it goes without saying that the slope portion 35 may also be provided.

In the recording tape cartridge 10 of the second embodiment as structured above, the operation thereof is described hereinafter. In the recording tape cartridge 10 having the aforementioned structure, when it is not in use (stored or transported), the opening 18 is closed by the door 30. When the recording tape T is in use, the recording tape cartridge 10 is loaded into the drive device along the direction indicated by arrow A with the front side wall 12A taking the lead. Consequently, the loader tray 40 is in a standby state at the loading gate, and therefore, the recording tape cartridge 10 is loaded in the loader tray 40.

At this time, in the same manner as in the first embodiment, the recording tape cartridge 10 is loaded while it is being pressed downward by the pressure contact portion 44 of the plate spring 42. However, the concave portion 34 having a predetermined depth is formed on the outer surface of the top plate 14A of the upper case 14 and also on the sliding track of the pressure contact portion 44, and therefore, the pressing force (frictional force) of the pressure contact portion 44 with respect to the top plate 14A during the loading is reduced.

Accordingly, the force of the pressure contact portion 44 (plate spring 42) scraping against the outer surface of the top plate 14A of the upper case 14 is reduced, and generation of abrasion dust from the outer surface of the top plate 14A can be restrained. Consequently, it is possible to prevent occurrence of errors at the time of recording and reproducing, or impediment of tracking, each of which is caused from ingress of abrasion dust from the opening 18 to the interior of the case 12, and adherence of the abrasion dust to the recording tape T, or from scattering of the abrasion dust toward a recording/reproducing head (described later) or in a tape conveying passage, and also prevent the abrasion dust from causing failure of a drive mechanism, or the like.

Further, when the pressure contact portion 44 moves sliding in a relative manner in the concave portion 34 and loading of the recording tape cartridge 10 in the forward direction with respect to the loader tray 40 is completed, the pressure contact portion 44 comes out from the concave portion 34 and presses the low-friction and hard-wearing member 38 provided on the outer surface of the top plate 14A at a predetermined pressure. As a result, the recording tape cartridge 10 is favorably pressed downward and accurately positioned in the loader tray 40.

Further, when the recording tape cartridge 10 is loaded in the loader tray 40, a convex portion for the opening/closing operation provided on the right side wall of the loader tray 40 engages with the convex portion 32 of the door 30. In this state, when the recording tape cartridge 10 moves into the loader tray 40 in the direction indicated by arrow A, the convex portion for the opening/closing operation moves the convex portion 32 relatively rearward against the urging force of the coil spring. Consequently, the door 30 having the convex portion 32 protruding therefrom moves sliding rearward in the groove portion 28 along the right side wall 12B, and opens up the opening 18 (see FIG. 5B).

In this manner, when the recording tape cartridge 10 is completely loaded in the loader tray 40 and the opening 18 is completely opened up, the loader tray 40 further moves to the predetermined position in the direction indicated by arrow A, and subsequently, it moves downward by a predetermined height with the recording tape cartridge 10 accommodated therein. Consequently, a positioning member (not shown) of the drive device is relatively inserted in a positioning hole (not shown) formed in the lower case 16, and the recording tape cartridge 10 is accurately positioned at a predetermined position in the drive device.

Further, during the downward movement of the loader tray 40 (recording tape cartridge 10), the rotation shaft enters relatively from the gear opening and causes the drive gear to mesh with the reel gear. At this time, the recording tape cartridge 10 is urged downward (toward the bottom plate 40B of the loader tray 40) by the plate spring 42 provided in the loader tray 40, and therefore, the drive gear can reliably mesh with the reel gear. Then, during the meshing operation of the drive gear with respect to the reel gear, the reel 20 moves upward by a predetermined height (to the position at which the tape can be moved) within the case 12, and is made rotatable relative to the case 12.

Moreover, the pull-out member provided in the drive device ingresses in the case 12 form the opened opening 18, and holds and pulls out the leader pin 26. The leader pin 26 pulled out from the opening 18 is accommodated in a take-up reel (not shown). Due to the take-up reel and the reel 20 being driven to rotate in a synchronous manner, the recording tape T is sequentially pulled out from the case 12 while it is being wound on the take-up reel, and information is recorded or reproduced by using a recording/reproducing head (not shown) disposed along a predetermined tape path.

In the case in which the recording tape cartridge 10 is discharged from the drive device after recording or reproducing of information is completed, the recording tape T is wound back to the reel due to the rotation shaft rotating reversely. Then, when the recording tape T is wound back to the reel 20 to the end and the leader pin 26 is accommodated and held in the case 12, the loader tray 40 (recording tape cartridge 10) moves upward by a predetermined height, and the positioning member is pulled out from the positioning hole portion. At the same time, the reel 20 moves downward to its original position in the case 12 and the rotation shaft is pulled out form the gear opening, thereby causing meshing of the drive gear with respect to the reel gear to be released.

When the loader tray 40 moves to its original position in a direction opposite to the direction indicated by arrow A, the recording tape cartridge 10 is moved by an eject mechanism (not shown) in the direction opposite to the direction indicated by arrow A, and is discharged from the loader tray 40. Consequently, due to the aforementioned movement, the door 30 moves sliding in the direction in which the opening 18 is closed, by means of the urging force of the coil spring, and the opening 18 is closed (the door returns to its initial state).

Further, at this time, the pressure contact portion 44 of the plate spring 42 moves from the low-friction and hard-wearing member 38 into the concave portion 34, and is made to move sliding in the concave portion 34 in a direction opposite to the direction of loading (in the direction opposite to the direction indicated by arrow A). In the same way as above, generation of abrasion dust from the top plate 14A is restrained. In this manner, the recording tape cartridge 10 is completely discharged from the drive device (loader tray 40).

Figure 6:
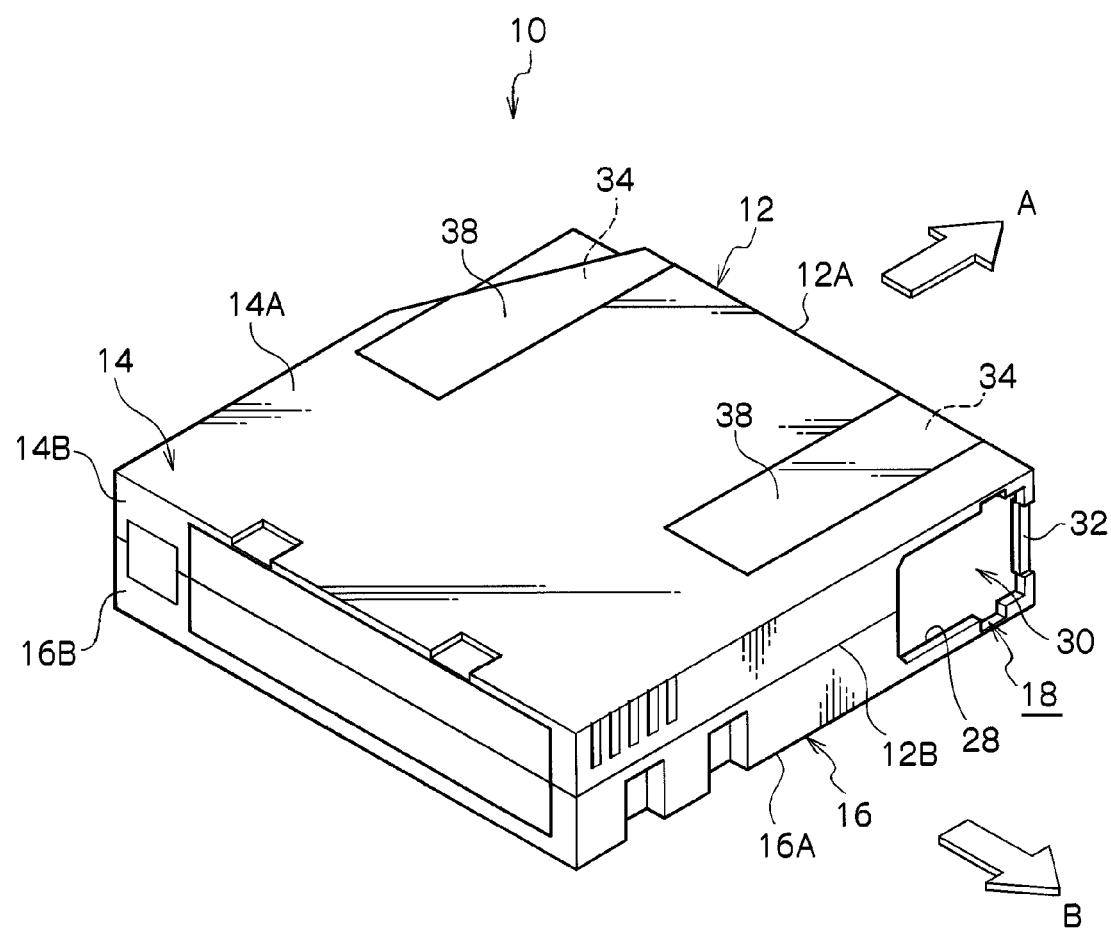
FIG. 6 is a perspective view schematically showing a recording tape cartridge of a modified example of the second embodiment.

In the recording tape cartridge 10 shown in FIG. 4 and FIGS. 5A and 5B, the low-friction and hard-wearing member 38 is provided in a region (a second region) corresponding to the pressure-applied portion 36. However, as in the modified examples shown in, for example, FIG. 6 and FIGS. 7A and 7B, the low-friction and hard-wearing member 38 may also be provided continuously (or in a discontinuous manner) even from the concave portion 34 (first region) (and also at the slope portion 35 if the slope portion 35 is provided).

Further, a structure may be provided in which the thickness of the low-friction and hard-wearing member 38 is made smaller than that illustrated in the drawings, and is provided in a region that corresponds to the concave portion 34 (slope portion 35) and the pressure applied portion 36 (that is, a region through which the pressure contact portion 44 of the plate spring 42 passes) without forming the concave portion 34 (slope portion 35). In either case, it suffices that the low-friction and hard-wearing member 38 may be provided in a region that corresponds to at least the pressure applied portion 36, and as shown in FIGS. 4, 5A, 5B, 6, 7A and 7B, the low-friction and hard-wearing member 38 is desirably provided substantially on the same plane as the outer surface of the tope plate 14A.

As mentioned above, the recording tape cartridge 10 according to the present embodiments was described, but it is not limited to the embodiments as illustrated and various design changes may be made without departing from the scope of the invention. For example, in the first embodiment as above, the low-friction and hard-wearing member 38 may also be provided in the pressure applied portion 36 by sticking or the like. Further, the pressure applied portion 36 may be provided at a position higher than the outer surface of the top plate 14A. In this case, the pressure-applied portion 36 can be used as a stacking rib of the recording tape cartridge 10.

Moreover, a structure in which the plate spring 42 is provided on the left side wall of the loader tray 40, and the recording tape cartridge 10 is urged against the right side wall of the loader tray 40, thereby resulting in fix engagement of the convex portion for the opening/closing operation with respect to the convex portion 32 of the door 30 may also be provided. In this case, due to the concave portion 34 or the low-friction and hard-wearing member 38 being provided on the left side wall of the recording tape cartridge 10, the aforementioned structure can correspond to that of the present invention in a similar manner. Further, the plate spring 42 to be provided in the loader tray 40 may be mounted on the top plate 40A as a separate member from the loader tray 40.

In either case, it is necessary that the recording tape cartridge 10 is pressed (urged) downward by the plate spring 42 in order to achieve positioning of the recording tape cartridge 10 in the loader tray 40. However, it suffices that the recording tape cartridge 10 may be pressed (made to come into contact with pressure) by the pressure contact portion 44 of the plate spring 42 in the pressure-applied portion 36, and other region than the pressure-applied portion 36 do not need to be pressed (made to come into contact with pressure).

Accordingly, at the time of loading the recording tape cartridge 10 into the drive device, it is effective to form the concave portion 34 on the outer surface of the top plate 14A in a region where the pressure contact portion 44 of the plate spring 42 arrives at the pressure applied portion 36, thereby making it possible to reduce the pressing force (frictional force) on the top plate 14A by the pressure contact portion 44 of the plate spring 42 (in this case, a case in which the plate spring 42 is not brought into contact with the top plate 14A is also encompassed). As a result, generation of abrasion dust from the top plate 14A can be restrained to the utmost, and can be further prevented.

What is claimed is:

1. A recording tape cartridge and drive device for reducing friction comprising:
    a drive device that has a top plate and a bottom plate, the top plate including a plate spring that is bent downward to the bottom plate, and
    a recording tape cartridge that is loadable into the drive device, the recording tape comprising:
    a case in which a single reel with a recording tape wound thereon is rotatably accommodated;
    a first region of the case, through which the plate spring provided in the drive device passes during loading of the recording tape cartridge into the drive device; and
    a second region of the case, which is disposed at a position higher than the first region and with which the plate spring comes into contact with pressure after the recording tape cartridge is loaded into the drive device.

2. The recording tape cartridge and drive device for reducing friction according to claim 1, wherein a low-friction and hard-wearing member is provided on at least the second region among the first region and the second region.

3. The recording tape cartridge and drive device for reducing friction according to claim 2, wherein the low-friction and hard-wearing member is made of crystalline resin material whose coefficient of friction is lower and which is less subject to wear compared to polycarbonate resin and acrylonitrile-butadiene-styrene resin.

4. The recording tape cartridge and drive device for reducing friction according to claim 1, wherein the width of the first region is substantially equal to or larger than the width of the plate spring.

5. The recording tape cartridge and drive device for reducing friction according to claim 1, wherein an upward slope portion is formed continuously from the first region to the second region between the first region and the second region.

6. The recording tape cartridge and drive device for reducing friction according to claim 5, wherein the width of the slope portion is substantially equal to the width of the first region.

7. A recording tape cartridge and drive device for reducing friction comprising:
    a drive device that has a top plate and a bottom plate, the top plate including a plate spring that is bent downward to the bottom plate, and
    a recording tape cartridge that is loadable into the drive device, the recording tape comprising:
    a case in which a single reel with a recording tape wound thereon is rotatably accommodated;
    a first region of the case, through which the plate spring provided in the drive device passes during loading of the recording tape cartridge into the drive device; and
    a second region of the case, with which the plate spring comes into contact with pressure after the recording tape cartridge is loaded into the drive device,
    a low-friction and hard-wearing member being provided on at least the second region among the first region and second region.

8. The recording tape cartridge and drive device for reducing friction according to claim 7, wherein the width of the first region is substantially equal to or larger than the width of the plate spring.

9. The recording tape cartridge and drive device for reducing friction according to claim 7, wherein the low-friction and hard-wearing member is continuously formed on the first and second regions.

10. The recording tape cartridge and drive device for reducing friction according to claim 7, wherein the low-friction and hard-wearing member is provided to be the substantially same plane as the outer surface of the case.

11. The recording tape cartridge and drive device for reducing friction according to claim 7, wherein the low-friction and hard-wearing member is made of crystalline resin material whose coefficient of friction is lower and which is less subject to wear compared to polycarbonate resin and acrylonitrile-butadiene-styrene resin.

* * * * *

UNITED STATES PATENT AND TRADEMARK OFFICE
CERTIFICATE OF CORRECTION

PATENT NO.       : 8,144,428 B2
APPLICATION NO.  : 12/554008
DATED            : March 27, 2012
INVENTOR(S)      : Hideaki Shiga It is certified that error appears in the above-identified patent and that said Letters Patent is hereby corrected as shown below:

In column 9, line 51, insert the word --cartridge-- between the words "tape" and "comprising".

In column 10, line 29, insert the word --cartridge-- between the words "tape" and "comprising".

Signed and Sealed this
Twenty-third Day of October, 2012

David J. Kappos
*Director of the United States Patent and Trademark Office*

US008144428C1

(12) EX PARTE REEXAMINATION CERTIFICATE (10229th)
United States Patent
Shiga

(10) Number: US 8,144,428 C1
(45) Certificate Issued: Jul. 23, 2014

(54) RECORDING TAPE CARTRIDGE AND DRIVE DEVICE FOR REDUCING FRICTION

(75) Inventor: Hideaki Shiga, Kanagawa (JP)

(73) Assignee: FUJIFILM Corporation, Minato-Ku, Tokyo (JP)

Reexamination Request:
No. 90/012,877, May 24, 2013

Reexamination Certificate for:
Patent No.: 8,144,428
Issued: Mar. 27, 2012
Appl. No.: 12/554,008
Filed: Sep. 4, 2009

Certificate of Correction issued Oct. 23, 2012

(30) Foreign Application Priority Data

Sep. 25, 2008 (JP) ................. 2008-246790

(51) Int. Cl.
*G11B 15/60* (2006.01)
(52) U.S. Cl.
USPC ............................. 360/132; 360/93

(58) Field of Classification Search
None
See application file for complete search history.

(56) References Cited

To view the complete listing of prior art documents cited during the proceeding for Reexamination Control Number 90/012,877, please refer to the USPTO's public Patent Application Information Retrieval (PAIR) system under the Display References tab.

*Primary Examiner* — Fred Ferris

(57) ABSTRACT

The present invention provides a recording tape cartridge that when loaded in a drive device, generation of abrasion dust from a case can be restrained. The recording tape cartridge includes: a case in which a single reel with a recording tape being wound thereon is rotatably accommodated; a first region of the case, through which a plate spring provided in a drive device passes during loading of the recording tape cartridge into the drive device; and a second region of the case, which is disposed at a position higher than the first region and with which the plate spring comes into contact with pressure after the recording tape cartridge is loaded into the drive device.

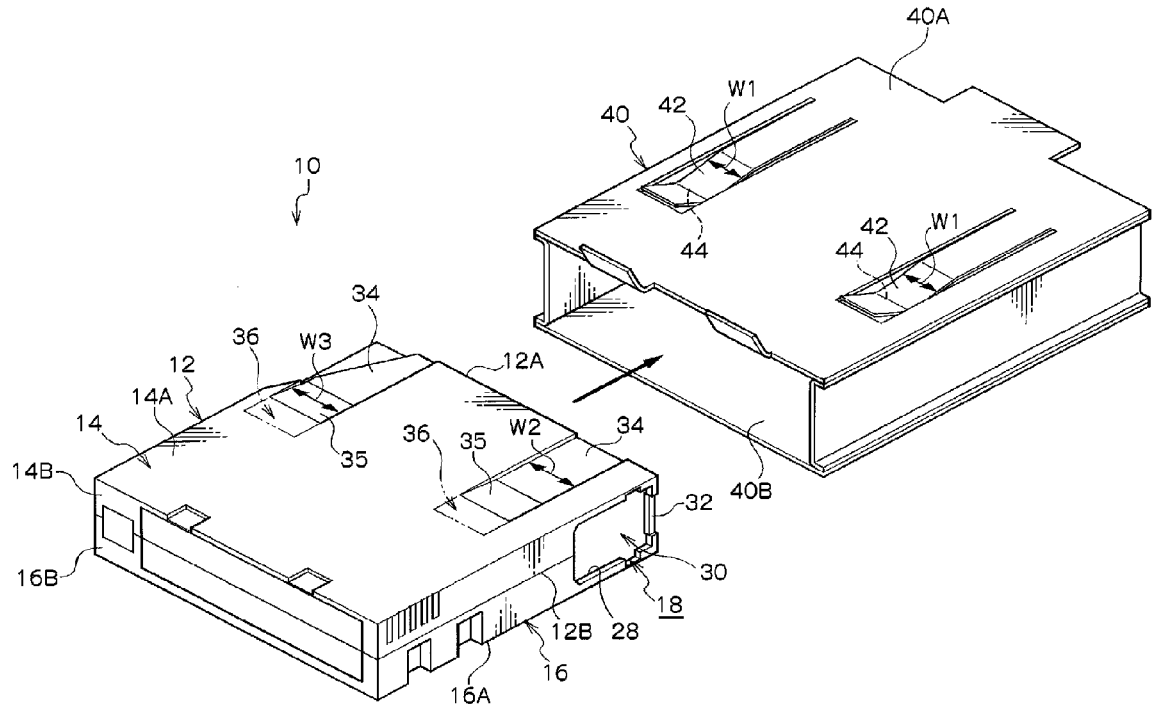

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 7-11 are cancelled.

Claims 1-6 were not reexamined.

\* \* \* \* \*